US012116818B1

(12) United States Patent
Liu et al.

(10) Patent No.: US 12,116,818 B1
(45) Date of Patent: Oct. 15, 2024

(54) QUIET HINGE MECHANISM ASSEMBLY

(71) Applicant: MOTOMOTION CHINA CORPORATION, Changzhou (CN)

(72) Inventors: Chih Hsiung Liu, Benoni (ZA); Hao Guo Jiang, Changzhou (CN)

(73) Assignee: MOTOMOTION CHINA CORPORATION, Changzhou (CN)

( * ) Notice: Subject to any disclaimer, the term of this patent is extended or adjusted under 35 U.S.C. 154(b) by 0 days.

(21) Appl. No.: 18/126,412

(22) Filed: Mar. 25, 2023

(51) Int. Cl.
*E05D 11/00* (2006.01)
*E05D 5/16* (2006.01)
*E05D 11/06* (2006.01)
*E05D 5/14* (2006.01)

(52) U.S. Cl.
CPC ................ *E05D 5/16* (2013.01); *E05D 11/06* (2013.01); *E05D 2005/145* (2013.01)

(58) Field of Classification Search
CPC E05D 5/121; E05D 5/04; E05D 5/043; E05D 5/06; E05D 5/062; E05D 5/16; E05D 11/06; E05D 7/1044; E05D 7/121; E05D 2005/102; E05D 2005/145; E05Y 2201/632; E05Y 2900/50; E05Y 2900/531; B60J 5/047
See application file for complete search history.

(56) References Cited

U.S. PATENT DOCUMENTS 9,422,016 B2 * 8/2016 Mangiarino ........... B62D 65/06
2004/0231103 A1 * 11/2004 Magnuson .............. E05D 5/121 16/340
2013/0104341 A1 * 5/2013 Kenerly .................... E05D 5/16 16/273
2013/0117966 A1 * 5/2013 Branning ................ E05D 11/00 16/273
2018/0051500 A1 * 2/2018 Lajewardi ............... F16C 33/20
2019/0093401 A1 * 3/2019 Hoenig ................. F16C 33/203
2019/0153757 A1 * 5/2019 Rahman .................. E05D 5/121
2020/0408014 A1 * 12/2020 Morinaga ................. E05D 7/10
2022/0243510 A1 * 8/2022 Prison ...................... E05D 5/128
2023/0287718 A1 * 9/2023 Prison ........................ E05D 3/02

FOREIGN PATENT DOCUMENTS

CN 211008193 U * 7/2020
EP 1398440 A2 * 3/2004 ......... E05D 11/1042
GB 2287061 A * 9/1995 ........... E05D 11/081

* cited by examiner

*Primary Examiner* — Chuck Y Mah
(74) *Attorney, Agent, or Firm* — Law Offices of Steven W. Weinrieb

(57) ABSTRACT

A new and improved quiet hinge mechanism assembly comprises first and second hinge plates, and first and second connect plates. A pin shaft passes through the first and second connect plates, and a bushing and gasket are mounted upon the pin shaft such that the first connect plate does not engage the pin shaft, and the first and second connect plates do not engage each other. In addition, the bushing and the gasket are fabricated from a suitable, self-lubricating material, such as, for example, polyoxymethylene (POM), thereby rendering the new and improved hinge mechanism assembly quiet.

15 Claims, 5 Drawing Sheets

QUIET HINGE MECHANISM ASSEMBLY

FIELD OF THE INVENTION

The present invention relates generally to hinge mechanism assemblies, and more particularly to a quiet hinge mechanism assembly which may be utilized in connection with certain furniture pieces, such as, for example, powered beds that are utilized within hospitals, long-term care centers, rehabilitation centers, and the like, wherein the quiet operation of the hinge mechanism assemblies, operatively connecting relatively movable sections of such beds, is clearly appreciated so as not to generate undesired noise which may bother bed-ridden patients.

BACKGROUND OF THE INVENTION

Various different furniture pieces, such as, for example, powered beds that are utilized within hospitals, long-term care centers, rehabilitation centers, and the like, usually comprise different sections which are movable with respect to each other so as to be disposed at different positions which will permit different sections of a patient's body, such as, for example, the head, torso, and legs of the patient, to be moved to different positions in order to maximize the proper support of such different sections of the patient's body, and/or to render the patient more comfortable. As is well known, such sections of the powered bed are hingedly connected together, and it is desired that the operation of the hinge mechanisms, operatively connecting the relatively movable sections of such beds together, move in a quiet manner with respect to each other so as not to disturb the patients by means of grinding, squeaking, or rattling noises normally generated by means of conventional hinge mechanisms.

A need therefore exists in the art for a new and improved hinge mechanism. Another need exists in the art for a new and improved hinge mechanism wherein the movable sections of the hinge mechanism can move with respect to each other in a quiet manner. A further need exists in the art for a new and improved quiet hinge mechanism wherein the movable sections of the hinge mechanism can move with respect to each other in a quiet manner which is particularly desired to be utilized within specific environments. Yet another need exists in the art for a new and improved quiet hinge mechanism wherein the movable sections of the hinge mechanism can move with respect to each other in a quiet manner which is particularly desired to be utilized within specific environments, such as, for example, hospitals, long-term care centers, rehabilitation centers, and the like. Still another need exists in the art for a new and improved quiet hinge mechanism wherein the movable sections of the hinge mechanism can move with respect to each other in a quiet manner which is particularly desired to be utilized within specific environments, such as, for example, hospitals, long-term care centers, rehabilitation centers, and the like, so as not to generate unwanted or undesirable noises, such as, for example, grinding, squeaking, or rattling noises characteristic of conventional hinge mechanisms. Still yet another need exists in the art for a new and improved quiet hinge mechanism wherein the movable sections of the hinge mechanism can move with respect to each other in a quiet manner which is particularly desired to be utilized within specific environments, such as, for example, hospitals, long-term care centers, rehabilitation centers, and the like, so as not to generate unwanted or undesirable noises, such as, for example, grinding, squeaking, or rattling noises, characteristic of conventional hinge mechanisms, so as not to disturb patients present within the aforenoted environments.

Overall Objectives of the Invention

An overall objective of the present invention is to provide a new and improved hinge mechanism. Another overall objective of the present invention is to provide a new and improved hinge mechanism wherein the movable sections of the hinge mechanism can move with respect to each other in a quiet manner. A further overall objective of the present invention is to provide a new and improved quiet hinge mechanism wherein the movable sections of the hinge mechanism can move with respect to each other in a quiet manner which is particularly desired to be utilized within specific environments. Yet another overall objective of the present invention is to provide a new and improved quiet hinge mechanism wherein the movable sections of the hinge mechanism can move with respect to each other in a quiet manner which is particularly desired to be utilized within specific environments, such as, for example, hospitals, long-term care centers, rehabilitation centers, and the like. Still another overall objective of the present invention is to provide a new and improved quiet hinge mechanism wherein the movable sections of the hinge mechanism can move with respect to each other in a quiet manner which is particularly desired to be utilized within specific environments, such as, for example, hospitals, long-term care centers, rehabilitation centers, and the like, so as not to generate unwanted or undesirable noises, such as, for example, grinding, squeaking, or rattling noises characteristic of conventional hinge mechanisms. Still yet another overall objective of the present invention is to provide a new and improved quiet hinge mechanism wherein the movable sections of the hinge mechanism can move with respect to each other in a quiet manner which is particularly desired to be utilized within specific environments, such as, for example, hospitals, long-term care centers, rehabilitation centers, and the like, so as not to generate unwanted or undesirable noises, such as, for example, grinding, squeaking, or rattling noises, characteristic of conventional hinge mechanisms, so as not to disturb patients present within the aforenoted environments.

SUMMARY OF THE INVENTION

The foregoing and other objectives are met in accordance with the principles and teachings of the present invention wherein the hinge mechanism assembly comprises a first hinge plate assembly that includes a first hinge plate which is oriented perpendicular to a first connect plate and which has a first set of through-holes or apertures defined therein so as to permit the first hinge plate to be fixedly connected to a first member, and a second hinge plate assembly that includes a second hinge plate which is oriented perpendicular to a second connect plate and which has a second set of through-holes or apertures defined therein so as to permit the second hinge plate to be fixedly connected to a second member wherein the first hinge plate assembly can be pivotally or rotationally moved with respect to the second hinge plate assembly. One side of the first connect plate is provided with a third through-bore or aperture, while one side of the second connect plate is similarly provided with a fourth through-bore or aperture. A pin shaft, comprising a proximal head and first and second boss regions, is adapted to have the first boss region, which has a larger diametrical extent than that of the second boss region, pass through the third through-bore or aperture of the first connect plate, while the second boss region passes through the fourth through-bore or aperture of the second connect plate. The distal end of the headed pin shaft is then punched to as to effectively define a distal head portion which has been mushroomed radially outwardly in a manner similar to that when forming a rivet head, whereby the first and second connect plates, as well as the first and second hinge plates, are pivotally connected together.

In addition, a flanged bushing, comprising an annular body portion and an annular flanged head portion, is interposed between the proximal head portion of the pin shaft and the first connect plate so as to annularly surround the first boss region of the pin shaft, while the body portion of the bushing is accommodated within the third aperture or through-bore of the first connect plate. In this manner, the third through-bore or aperture of the first connect plate is not in direct contact with either one of the first or second boss regions of the pin shaft in view of the fact that the third through-bore or aperture of the first connect plate is disposed around and effectively sits upon the body portion of the bushing. In addition, the first connect plate is also not in direct contact with the proximal head portion of the pin shaft in view of the fact that the first connect plate is disposed in contact with the annular flanged head portion of the bushing. Furthermore, an annular gasket is interposed between the first connect plate and the second connect plate and is also adapted to annularly surround, and be seated upon, the first boss region of the pin shaft when the pin shaft is inserted through the first connect plate. The second boss region of the pin shaft will then extend through the fourth aperture or through-bore of the second connect plate whereby the distal end of the pin shaft can then be punched and deformed as has been previously noted. It is to be noted that the bushing and gasket are preferably fabricated from a suitable, self-lubricating material, such as, for example, polyoxymethylene (POM). In addition, it is also to be noted and appreciated that only the bushing, the first connect plate, and the gasket will pivot or rotate upon the pin shaft as the first hinge plate and first connect plate are pivoted or rotated with respect to the second hinge plate and second connect plate. All of these cumulative features render the hinge mechanism exceptionally quiet during usage. Lastly, a limit stop is provided upon the one side of the first connect plate, adjacent to the third through-bore or aperture, so as to limit or predetermine the range of movement of the first connect plate and first hinge plate relative to the second connect plate and second hinge plate. More particularly, as a result of the provision of the limit stop, the first hinge plate is permitted to pivot or rotate relative to the second hinge plate a full 180 degrees between coplanar extended and overlapping parallel positions, as well as achieve any one of a multitude of intermediate positions.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
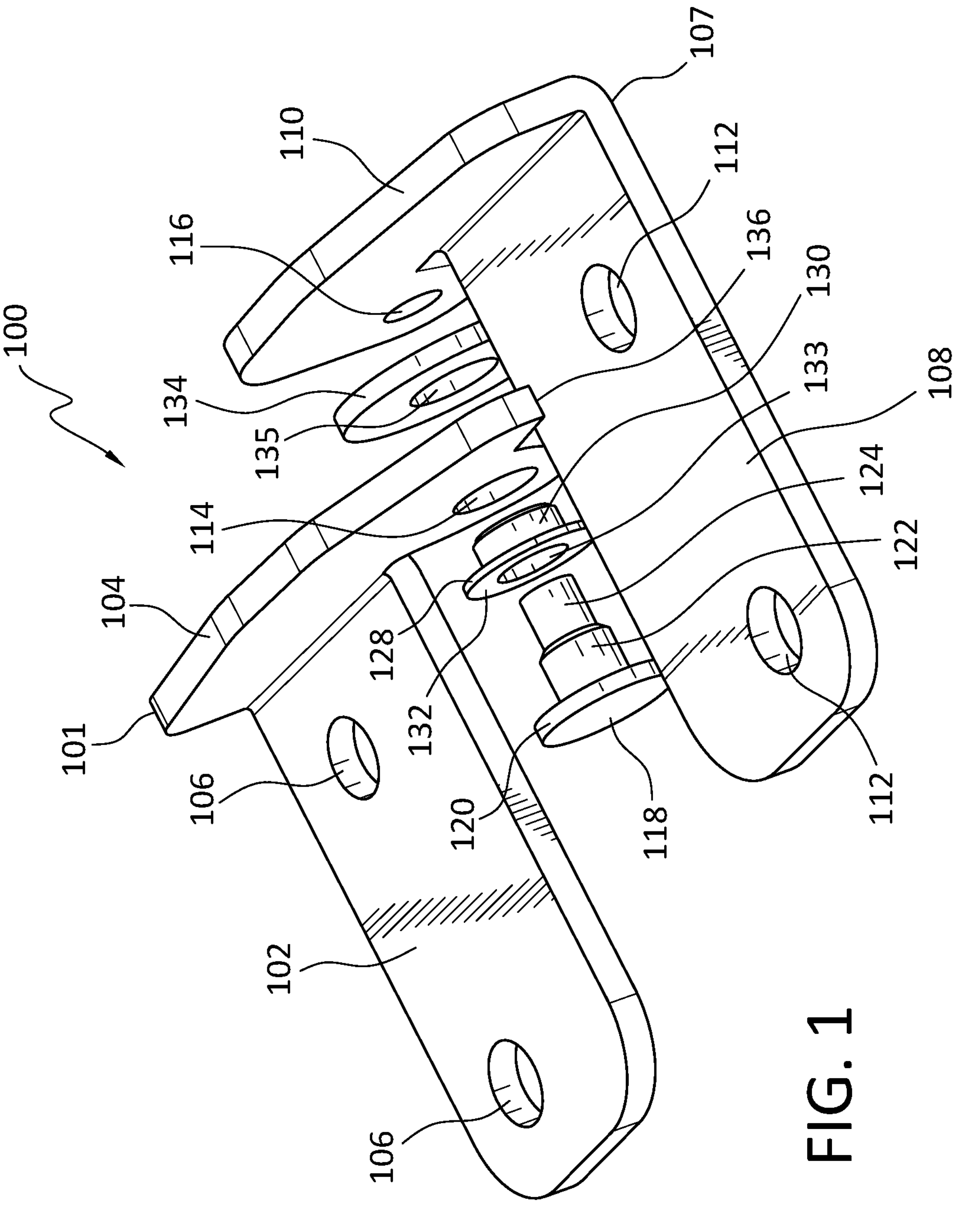
FIG. 1 is an exploded perspective view of a new and improved quiet hinge mechanism assembly as constructed in accordance with the principles and teachings of the present invention.
Figure 2:
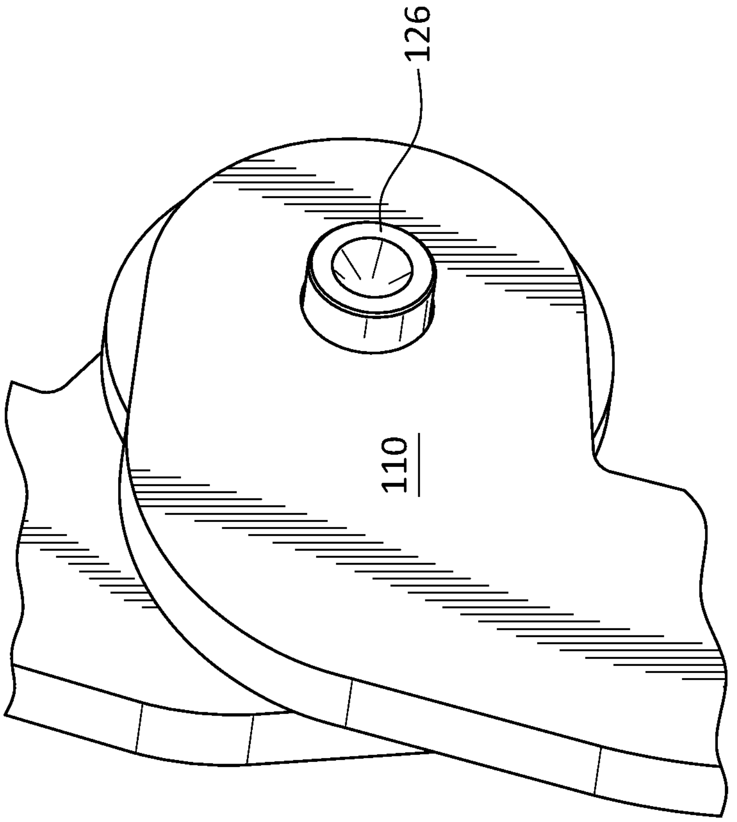
FIG. 2 is a distal end perspective view of the new and improved quiet hinge mechanism assembly as illustrated within FIG. 1, showing, in particular, the punched hole formed within the distal end portion of the headed pin shaft so as to cause the distal end portion of the headed pin shaft to mushroom radially outwardly and thereby effectively secure the first and second hinge plates together.

With reference now being made to the drawings, and more particularly to FIG. 1 thereof, the new and improved quiet hinge mechanism assembly, as constructed in accordance with the principles and teachings of the present invention, is illustrated and is generally indicated by the reference character 100. More particularly, it is seen that the new and improved quiet hinge mechanism assembly 100 comprises a first hinge plate assembly 101 that includes a first hinge plate 102 which is oriented perpendicular to, and fixedly connected to, a first connect plate 104. In addition, it is seen that the first hinge plate 102 has a first set of through-holes or apertures 106 defined therein so as to permit the first hinge plate 102 to fixedly connected to a first member. Still further, the new and improved quiet hinge mechanism assembly 100 also comprises a second hinge plate assembly 107 that includes a second hinge plate 108 which is oriented perpendicular to, and fixedly connected to a second connect plate 110. As was the base with the first hinge plate 102, the second hinge plate 108 has a second set of through-holes or apertures 112 defined therein so as to permit the second hinge plate 108 to be fixedly connected to a second member wherein the first hinge plate assembly 101 can be pivotally or rotationally moved with respect to the second hinge plate assembly 107. One side of the first connect plate 104 is provided with a third through-bore or aperture 114, while one side of the second connect plate 110 is similarly provided with a fourth through-bore or aperture 116. A headed pin shaft 118, comprising a proximal head member 120 and first and second boss regions 122, 124, is adapted to have the first boss region 122, which has a larger diametrical extent than that of the second boss region 124, pass through the third through-bore or aperture 114 of the first connect plate 104, while the second boss region 124 is adapted to pass through the fourth through-bore or aperture 116 of the second connect plate 110. The distal end of the headed pin shaft 118 is then punched to as to effectively define a distal head portion which is mushroomed radially outwardly in a manner similar to that when forming a rivet head, whereby the first and second connect plates 104, 110, as well as the first and second hinge plates 102, 108, are pivotally connected together, the deformed or mushroomed distal head portion of the headed pin shaft 118 being illustrated at 126 in FIG. 2.

Figure 3:
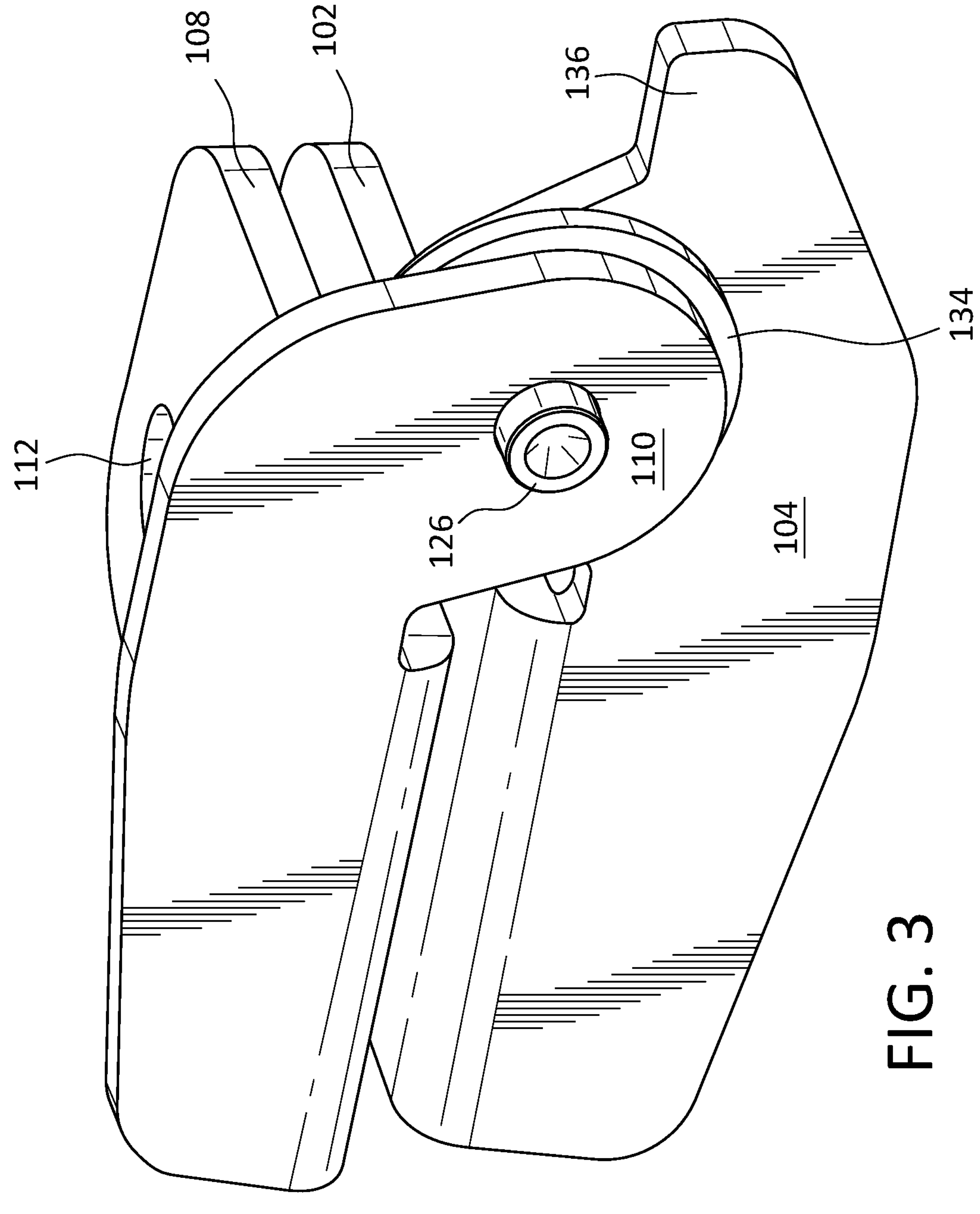
FIG. 3 is a distal end perspective view of the new and improved quiet hinge mechanism illustrating the relative disposition of the first and second hinge plates when the first hinge plate has been pivoted or rotated 180 degrees with respect to the second hinge plate such that the first and second hinge plates are disposed parallel to each other.
Figure 4:
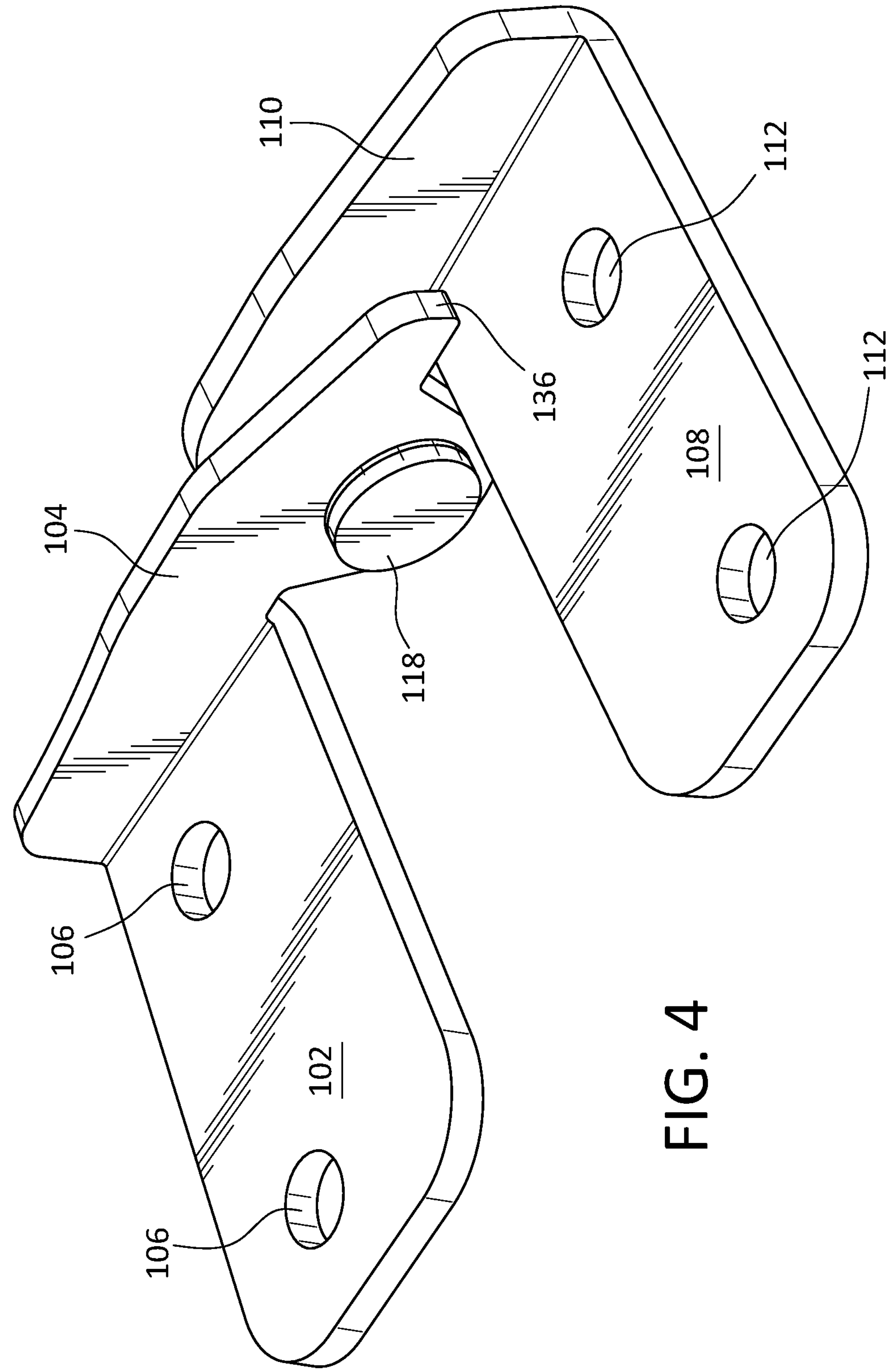
FIG. 4 is a proximal end perspective view of the new and improved quiet hinge mechanism illustrating the relative disposition of the first and second hinge plates when the first hinge plate has been pivoted or rotated 180 degrees in the direction opposite that illustrated within FIG. 3, with respect to the second hinge plate, such that the first and second hinge plates are disposed in a co-planar manner with respect to each other, the co-planar; disposition of the hinge plates being defined by means of the limit stop integral with the first connect plate of the first hinge plate assembly.
Figure 5:
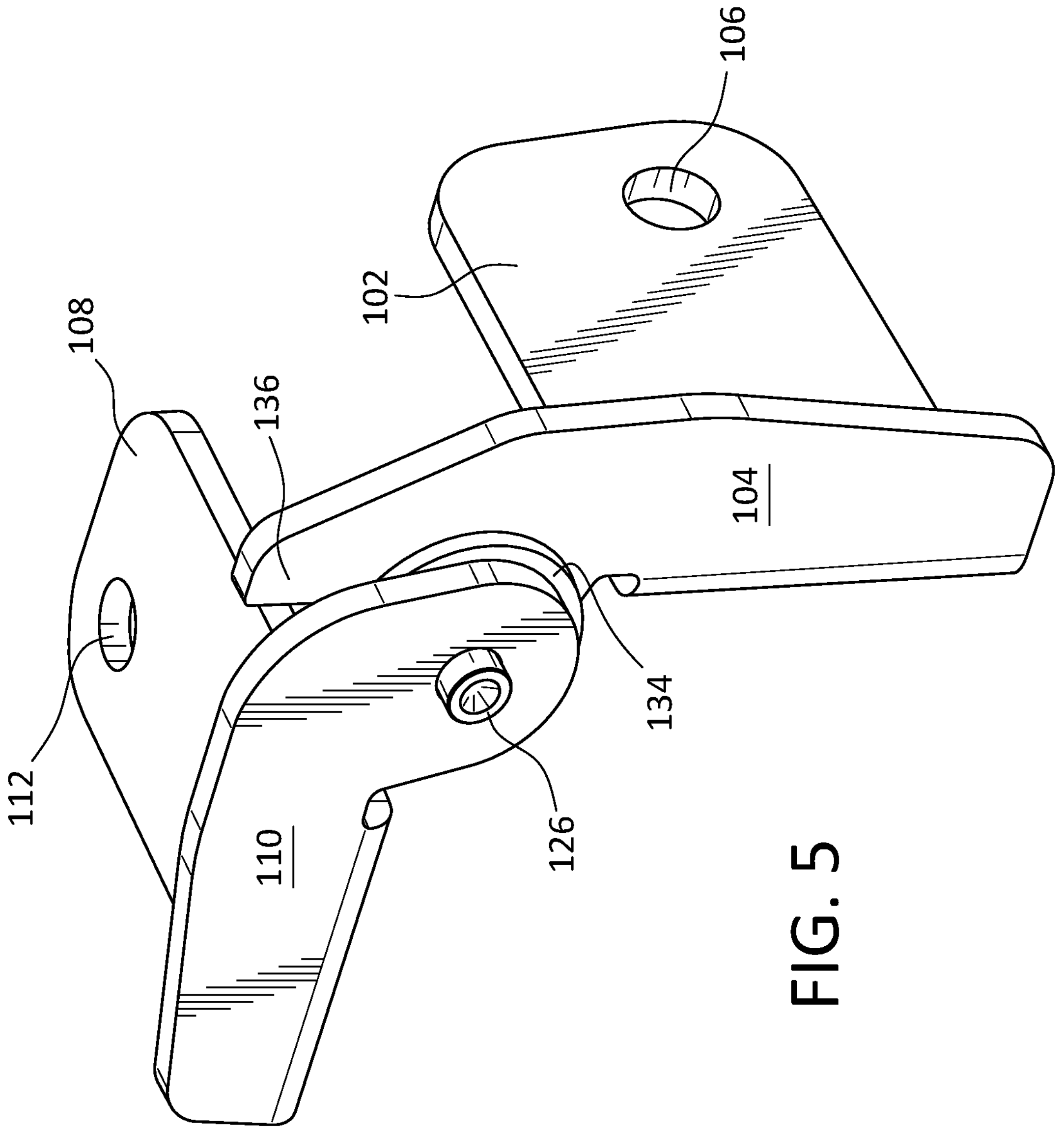
FIG. 5 is a distal end perspective view of the new and improved quiet hinge mechanism illustrating the relative disposition of the first and second hinge plates when the first hinge plate has been pivoted or rotated 90 degrees with respect to the second hinge plate such that the first and second hinge plates are disposed within planes perpendicular to each other.

In addition, reverting back to FIG. 1, a flanged bushing 128, comprising an annular body portion 130, an annular flanged head portion 132, and a through-bore or aperture 133, is interposed between the proximal head portion 120 of the pin shaft 118 and the first connect plate 104 so as to be seated upon and annularly surround the first boss region 122 of the pin shaft 118, while the annular body portion 130 of the flanged bushing 128 is also seated upon and also annularly surrounds the first boss region 122 of the pin shaft 118. In addition, it is to be appreciated that the annular body portion 130 of the flanged bushing 128 is accommodated within and extends through the third aperture or through-bore 114 of the first connect plate 104. In this manner, the third through-bore or aperture 114 of the first connect plate 104 is not in direct contact with either one of the first or second boss regions 122, 124 of the pin shaft 118. Still further, the first connect plate 104 is also not in direct contact with the proximal head portion 120 of the pin shaft 118. Furthermore, an annular gasket 134, having a central through-bore or aperture 135, is interposed between the first connect plate 104 and the second connect plate 110 and is also adapted to annularly surround, and be seated upon, the first boss region 122 of the pin shaft 118 when the pin shaft 118 is inserted through the first through-bore or aperture 114 of the first connect plate 104. The second boss region 124 of the pin shaft 118 will then extend through the fourth aperture or through-bore 116 of the second connect plate 110 whereby the distal end of the pin shaft 118 can then be punched and deformed as has been previously noted. It is to be noted that the bushing 130 and gasket 134 are preferably fabricated from a suitable, self-lubricating material, such as, for example, polyoxymethylene (POM). It is to be noted and appreciated further that only the bushing 130, the first connect plate 104, and the gasket 134 will pivot or rotate upon the pin shaft 118 as the first hinge plate 102 and the first connect plate 104 are pivoted or rotated with respect to the second hinge plate 108 and the second connect plate 110. All of these cumulative features render the hinge mechanism exceptionally quiet during usage. Lastly, a limit-stop 136 is provided upon the one side of the first connect plate 104, adjacent to the third through-bore or aperture 114, so as to engage the second hinge plate 108 and thereby limit or predetermine the range of movement of the first connect plate 104 and the first hinge plate 102 relative to the second connect plate 110 and the second hinge plate 108 when the first connect plate 104 and the first hinge plate 102 are pivoted or rotated, in the clockwise direction, relative to the second connect plate 110 and the second hinge plate 108, as viewed in the axial direction of the pin shaft 118 from the proximal head portion 120 toward the distal head portion 126. More particularly, as a result of the provision of the limit stop 136, the first hinge plate 102 is permitted to pivot or rotate relative to the second hinge plate 108 a full 180 degrees between a coplanar extended position as illustrated within FIGS. 1 and 4, and an overlapping parallel position as illustrated within FIG. 3. Still further, the first and second hinges plates 102, 108, as well as the first and second connect plates 104, 110 can effectively achieve one or more intermediate positions, a 90-degree position being illustrated, for example, within FIG. 5.

Obviously, many variations and modifications of the present invention are possible in light of the above teachings. It is therefore to be understood that within the scope of the appended claims, the present invention may be practiced otherwise than as specifically described herein.

What is claimed is:

1. A quiet hinge mechanism assembly, comprising:

a first hinge plate having a first connect plate fixedly connected thereto, wherein said first connect plate has a first through-bore defined therein;

a second hinge plate having a second connect plate fixedly connected thereto, wherein said second connect plate has a second through-bore defined therein;

a pin shaft extending through said first and second through-bores of said first and second connect plates such that said first hinge plate can freely pivot/rotate around said pin shaft with respect to said second hinge plate;

a bushing mounted upon said pin shaft, interposed between said pin shaft and said first connect plate, and separate and independent from said first connect plate such that said first connect plate can freely pivot/rotate around said bushing, and a gasket, separate and independent from said first connect plate, separate and independent from said bushing, mounted upon said pin shaft, and interposed between said first and second connect plates such that said hinge mechanism assembly comprises a connection, defined between said first and second connect plates, which comprises a serial array of a first head portion of said pin shaft, said bushing, said first connect plate, said gasket, said second connect plate, and a second head portion of said pin shaft; and wherein said bushing and said gasket are fabricated from polyoxymethylene (POM) such that when said first hinge plate pivots/rotates with respect to said second hinge plate, said hinge mechanism assembly is quiet.

2. The hinge mechanism assembly as set forth in claim 1, wherein:

said first hinge plate has at least one through-bore/aperture formed therein so as to permit said first hinge plate to be fixedly secured to a first member; and said first connect plate is fixedly connected to said first hinge plate so as to be disposed perpendicular thereto.

3. The hinge mechanism assembly as set forth in claim 1, wherein:

said pin shaft comprises said first head portion and first and second boss regions extending axially away from said first head portion.

4. The hinge mechanism assembly as set forth in claim 3, wherein:

said first boss region has a diametrical extent which is greater than that of said second boss region.

5. The hinge mechanism assembly as set forth in claim 4, wherein:

said bushing comprises a flanged head portion and a body portion.

6. The hinge mechanism assembly as set forth in claim 5, wherein:

when said hinge mechanism assembly is assembled together, said flanged head portion of said bushing will be disposed in contact with said said first head portion of said pin shaft, while said body portion of said bushing will be disposed upon said first, large diameter boss region of said pin shaft.

7. The hinge mechanism assembly as set forth in claim 6, wherein:

when said hinge mechanism assembly is assembled together, said first connect plate and said gasket will likewise be disposed upon said first, large diameter boss region of said pin shaft.

8. The hinge mechanism assembly as set forth in claim 7, wherein:

when said hinge mechanism assembly is assembled together, said body portion of said bushing will be disposed within said through-bore [/aperture] of said first connect plate.

9. The hinge mechanism assembly as set forth in claim 8, wherein:

when said hinge mechanism assembly is assembled together, and said first hinge plate is pivoted/rotated with respect to said second hinge plate, only said bushing, said first connect plate, and said gasket will rotate with respect to said pin shaft and said second hinge plate.

10. The hinge mechanism assembly as set forth in claim 1, wherein:

when said hinge mechanism assembly is assembled together, a distal end portion of said pin shaft will extend through said through-bore of said second connect plate so as to be capable of being punched whereby said distal end portion of said pin shaft will be mushroomed radially outwardly so as to form said second head portion of said pin shaft for fixedly securing said second connect plate to said hinge mechanism assembly.

11. The hinge mechanism assembly as set forth in claim 1, wherein:

said first connect plate is provided with a limit stop for engaging said second hinge plate when said first hinge plate is pivoted/rotated with respect to said second hinge plate a predetermined number of angular degrees.

12. The hinge mechanism assembly as set forth in claim 11, wherein:

said first and second hinge plates comprise planar structures; and when said limit stop of said first connect plate engages said second hinge plate, said first and second hinge plates will be disposed in a coplanar manner with respect to each other.

13. The hinge mechanism assembly as set forth in claim 12, wherein:

when said first hinge plate is rotated 180 degrees from said coplanar position with respect to said second hinge plate, said first and second hinge plates will be disposed within planes parallel to each other.

14. The hinge mechanism assembly as set forth in claim 13, wherein:

said first hinge plate is capable of being pivoted/rotated with respect to said second hinge plate to any position intermediate said coplanar and parallel positions.

15. The hinge mechanism assembly as set forth in claim 14, wherein:

said first hinge plate is movable to a position, relative to said second hinge plate, at which said first hinge plate is disposed within a first plane which is perpendicular to a second plane within which said second hinge plate is disposed.

* * * * *